Figure 1:
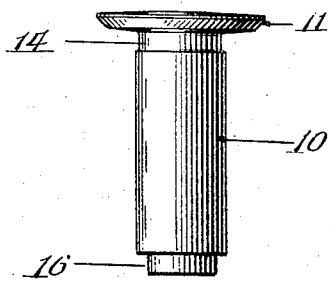

Aug. 3, 1926.

G. R. RICH 1,594,558

VALVE TAPPET

Filed Oct. 19, 1925

Inventor:
George R. Rich,
by Charles C. Sherway
his Atty.

Patented Aug. 3, 1926.

1,594,558

UNITED STATES PATENT OFFICE.

GEORGE R. RICH, OF BATTLE CREEK, MICHIGAN.

VALVE TAPPET.

Application filed October 19, 1925. Serial No. 63,456.

This invention relates to valve tappets for internal combustion engines, and of that type which employs a stem formed with a disc like head. It relates more particularly to two piece, forged, valve tappets. In the better grades of tappets, it is highly desirable that the heads thereof be composed of high heat resisting alloy so as to counteract the friction caused by the cam rubbing over the bearing face of the head, as this often raises the temperature of the tappets sufficiently to soften one made of ordinary steel, with the result that grooves are worn into the bearing face of the tappet and it becomes noisy and useless. High speed steel or other high heat resisting alloys are very desirable for tappets, but such metals are exceedingly costly and are not essential in the stem portion. Great difficulty has been encountered in manufacturing two piece tappets, of which the head portion is made of a higher heat resisting alloy than the stem portion, because of the high heat required for heating the head portion to a forging temperature. Forged, headed articles made from two pieces of metal, of which the exterior metal of the head portion exceeds the quantity of metal of the stem contained in the head, may be successfully united by a forging process, that I have developed for use in the manufacture of poppet valves, but when the metal of the portion of the stem which enters the head, exceeds the amount of metal contained in the exterior portion of the head, it is practically impossible to produce an operative device, because the metal of the stem takes the shape of a ball or enlargement of irregular and incontrollable form when the parts are forged into shape, and the exterior metal remains loose on the stem, which is fatal to a tappet or analogous article. I have manufactured two piece valve tappets using hollow stems and have found that in the manufacture thereof, especially where the metal of the head portion was made of high speed steel or steels of the same general character, that sometimes the exterior metal of the head portion would shear or pinch off the metal of the thin web which enters the head.

From my experiments, I have discovered that the amount of the material contained in the interior part of the head must not exceed that contained in the exterior portion, otherwise only moderately good results are obtained. I have also discovered that if the quantity of metal of the interior part of the head is less than that of the exterior portion and that if a solid abutment is provided for the exterior part of the head to bear against when the parts are being forged up, that the metal of the stem is spread evenly throughout the exterior part of the head and that the two pieces become fused together forming an integral piece. The result is that a practical, highly efficient valve tappet is produced which has the high heat resisting qualities necessary for the head and which can be made economically and which are light, rugged and durable.

The invention consists in a valve tappet or analogous article made from two pieces of metal, which may be of different kinds of material, the stem portion having a solid end part against which the exterior portion of the head abuts and having an annular, widely spreading, relatively thin fin projecting laterally into that part of the head which overhangs the stem, and fused thereto. It further consists in a forged two piece valve tappet or analogous article made from two pieces of metal, that may be composed of different materials, the stem having a concave, solid end portion terminating in an annular, widely flaring, relatively thin fin extending laterally into the exterior portion of the head, the head having a convex portion conforming to the concave end portion of the stem and the stem and head being fused together during the forging operation. The invention further consists in the several novel features hereinafter fully set forth and claimed.

Figure 2:
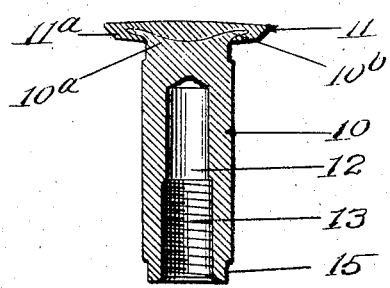
Figure 3:
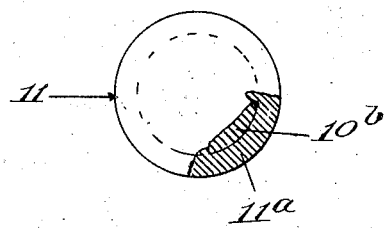
Figure 4:
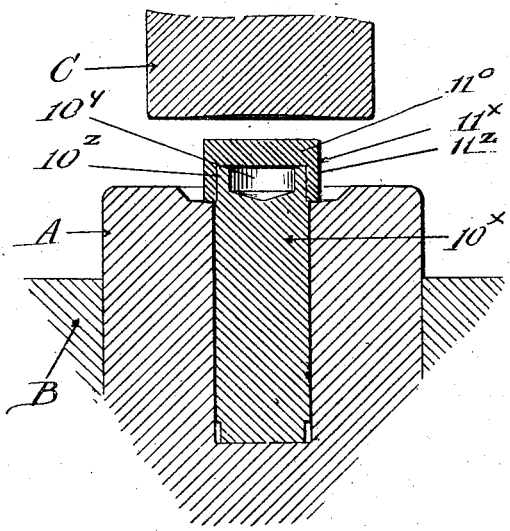
Figure 5:
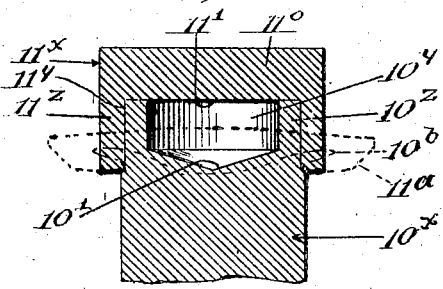
Figures 6, 7:
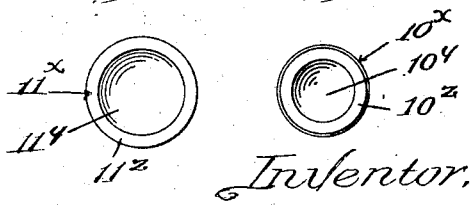

The invention is clearly illustrated in the drawing accompanying this specification, in which:

Fig. 1 is a side elevation of a valve tappet embodying a simple form of the present invention; Fig. 2 is a central longitudinal section thereof; Fig. 3 is an end view looking at the head portion and showing the same partly broken out; Fig. 4 is a central vertical section illustrating dies in which the tappet is shaped up and showing the two pieces or blanks from which the tappet is made; Fig. 5 is an enlarged central vertical section of a fragment of the blank which forms the stem portion and the blank which forms the exterior portion of the head and in dotted lines, showing the parts in the form they assume when operated upon by the forging dies; Fig. 6 is an end view of the blank which forms the exterior portion of the head and Fig. 7 is an end view of the blank which forms the stem portion.

Referring to said drawing, the reference character 10 designates the stem and 11 the disc like head of a valve tappet embodying a simple form of the present invention. The greater part of the stem may be bored out as at 12 to provide a hollow tappet stem. The bored portion may be threaded as at 13 for the reception of the adjustment stud (not shown), which is usually used in connection with valve tappets. If desired, the end of the stem adjacent the head may be slightly reduced in diameter to provide a neck like arrangement 14, and the other end of the stem may also be slightly reduced in diameter as at 15 and it is made flat as at 16 to permit a wrench to be applied thereto when adjusting the adjustment stud.

The stem 10 and the exterior portion of the head 11 are composed of two initially separate pieces of metal, shaped up and united by a forging process, and as a preference the exterior portion of the head is composed of an alloy of high heat resisting characteristics such for instance as high speed steel or other alloys containing tungsten. The stem may be made of straight steel or high grade steel alloys. Usually the stem of a valve tappet is of a relatively large diameter as compared with the stem of a poppet valve, and the great difficulty that has been encountered in forging together a tappet stem and head is the uncontrollability of the hot metal during the forging operation. If a hollow stem is used, the flow of the metal connot be controlled satisfactorily, and there has been the danger that the exterior metal of the head would shear off the metal fin of the interior part. If a solid stem is used the metal contained in the head usually forms into a ball or other irregularly shaped object and does not unite with the exterior portion of the head. Such a formation is useless in a tappet or analogous article.

In order to control the flow of the metal which composes the head, and to obtain a highly efficient union between the stem and head of a two piece forged tappet, I have found that while the quantity of metal of the portion of the stem that enters the head should be no greater than that of the exterior portion of the head, it is essential to provide a solid abutment for the exterior portion of the head to contact with during the forging operation, and that by reason of the impact between the two hot metals during the forging process, the two metals become fused together, thereby forming an integral connection between them.

Referring to Fig. 2, it will be seen that the end $10^a$ of the stem 10 enters the exterior metal portion $11^a$ of the head, and that the end face of the part $10^a$ is concave and that the inner face of the exterior metal part $11^a$ is convex and conforms to the shape of the end of the part $10^a$, and is contiguous therewith. Beyond the end part $10^a$ the stem terminates in an annular, widely flaring, relatively thin fin $10^b$, which extends into the part of the disc like exterior head portion $11^a$ that overhangs the stem. The exterior and interior parts of the head become fused together during the forging operation, thereby forming an integral structure in which the possibility of disconnection between the head and stem is completely eliminated.

In order to produce the tappet structure just described, I form a stem portion blank $10^x$ (see Figs. 4 to 7 inclusive) by cutting the proper length from a metal rod of suitable diameter, and bore out one end thereof as at $10^y$ to leave a relatively thin annular wall $10^z$. I also form a head piece blank $11^x$ which contains a central bore or cavity $11^y$ surrounded by a relatively thin annular wall $11^z$. The thickness of the body portion $11^o$ of the head blank and the thickness of the annular walls $10^z$ $11^z$, are carefully determined so that there may be substantially no waste when the head is forged up. The cavity of the head blank is made deeper than that of the stem whereby the annular wall $11^z$ of the head blank may protrude below the bottom of the cavity $10^y$. If desired the outer face of the stem around the wall $10^z$ may be turned off slightly and the inner face of the wall $11^z$ is made to fit fairly well on the wall $10^z$. The two pieces $10^x$ $11^x$, are assembled by placing the head piece on the stem piece, and they are then heated to the forging temperature required for forging the head piece, which is considerably more than that required for forging the stem, especially when the head piece is formed of high speed steel or the like.

The two pieces are then placed in a die A, having a suitable intaglio design in its upper face for giving shape to the head, the die placed in the anvil B of a suitable power hammer or other forging machine, and the upper die C (which is carried by the hammer arm of the hammer) brought down in a succession of blows upon the hot pieces, thereby spreading out the metal which protrudes from the die A, and giving it the shape of the head 11.

As the metal is pounded down and spread out, the annular wall $10^z$ of the stem portion begins to flare outwardly and over the wall $11^z$ of the head piece, and the bottom face $11^1$ of the cavity $11^y$ comes into contact with the bottom face $10^1$ of the cavity $10^y$ which then forms an abutment thereon and governs the flow and shape of the material. As the metal is hammered out, the flaring wall $10^z$ is bent downwards and under the face $11^1$ of the head piece. In the forging process, the metal of the head portion is made denser than the stem portion and because of the high heat and the force exerted by the hammer, the two pieces are fused together into one integral mass whereby the possibility of disconnection between the two is wholly eliminated. In hammering down the metal after the bottom faces 10¹, 11¹ become impacted, they take a concave-convex form as is roughly illustrated in the drawing. This affords a thickened middle part for the exterior metal of the head. After the tappet is forged, it is bored, tapped and finished as usual.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A valve tappet comprising a disc like head portion and a stem, composed of two pieces of metal, one piece forming the major and exterior portion of the head, and the other piece forming the stem and interior portion of the head, the stem having a concave solid end part forming an abutment for the inner face of the exterior portion of the head and having, beyond said solid part, an annular, laterally extending, relatively thin web portion projecting into the metal of the exterior portion of the head, the metal of the exterior portion of the head being thickened at its middle and conforming generally to the shape of the adjacent concave end face of the stem part, and the exterior and interior parts of the head being integral with each other.

2. A valve tappet comprising a disc like head portion and a hollow stem, composed of two pieces of metal, one piece forming the major and exterior portion of the head, and the other piece forming the hollow stem and interior portion of the head, the hollow stem having a solid concave end part at the head end forming an abutment for the exterior portion of the head and having, beyond said solid part, an annular, laterally extending, relatively thin web portion projecting into the metal of the exterior portion of the head, the metal of the exterior portion of the head being thickened at its middle and conforming generally to the shape of the adjacent concave end face of the stem part, and the exterior and interior parts of the head being integral with each other and being denser than the stem.

3. A valve tappet comprising a disc like head portion and a stem, composed of two pieces of metal, one piece forming the major and exterior portion of the head and having higher heat resisting properties than the stem, and the other piece forming the stem and interior portion of the head, the stem having a solid concave end part forming an abutment for the exterior portion of the head and having, beyond said solid part, an annular, laterally extending, relatively thin web portion projecting into the metal of the exterior portion of the head, the exterior part of the head being thickened towards its middle and abutting against said concave end part of the stem, and the exterior and interior parts of the head being integral with each other.

4. A valve tappet comprising a disc like head portion and a stem, composed of two pieces of metal, one piece forming the major and exterior portion of the head, and the other piece forming the stem and interior portion of the head, the stem having a solid, concave end part forming an abutment for the exterior portion of the head and terminating in a widely flaring, thin web which extends laterally into the metal of the exterior portion of the head, the exterior portion of the head being thickened towards its middle and the inner face of the exterior portion of the head conforming with the contiguous part of the stem contained in the head and being integral therewith.

5. A valve tappet comprising a disc like head portion and a hollow stem, composed of two pieces of metal, one piece forming the major and exterior portion of the head, and the other piece forming the hollow stem and interior portion of the head, the hollow stem having a solid, concave end part forming an abutment for the exterior portion of the head and terminating in a widely flaring, thin web which extends laterally into the metal of the exterior portion of the head, the exterior portion of the head being thickened towards its middle and the inner face of the exterior portion of the head conforming with the contiguous part of the stem contained in the head and being integral therewith.

GEORGE R. RICH.